US012678949B2

(12) United States Patent
Takahashi et al.

(10) Patent No.: US 12,678,949 B2
(45) Date of Patent: Jul. 14, 2026

(54) ROBOT CONTROL DEVICE

(71) Applicant: FANUC CORPORATION, Yamanashi (JP)

(72) Inventors: Yuutarou Takahashi, Yamanashi (JP); Yuta Namiki, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 25 days.

(21) Appl. No.: 18/879,482

(22) PCT Filed: Sep. 20, 2022

(86) PCT No.: PCT/JP2022/035009
§ 371 (c)(1),
(2) Date: Dec. 27, 2024

(87) PCT Pub. No.: WO2024/062535
PCT Pub. Date: Mar. 28, 2024

(65) Prior Publication Data
US 2025/0387908 A1     Dec. 25, 2025

(51) Int. Cl.
B25J 9/16          (2006.01)

(52) U.S. Cl.
CPC ........... B25J 9/1653 (2013.01); B25J 9/1664 (2013.01); B25J 9/1697 (2013.01)

(58) Field of Classification Search
USPC ................................................ 700/245–264
See application file for complete search history.

(56) References Cited

U.S. PATENT DOCUMENTS

| | | | | |
|---|---|---|---|---|
| 9,075,411 B2 * | 7/2015 | Aiso | ...................... | B25J 9/1692 |
| 9,188,973 B2 * | 11/2015 | Tenney | .................. | H04N 7/181 |
| 9,734,419 B1 * | 8/2017 | Ye | .............................. | G06T 7/85 |
| 10,434,654 B2 * | 10/2019 | Namiki | .................... | B25J 19/04 |
| 10,596,700 B2 * | 3/2020 | Corkum | .............. | G05B 19/423 |
| 11,014,233 B2 * | 5/2021 | Dan | ...................... | B25J 9/1697 |

(Continued)

FOREIGN PATENT DOCUMENTS

| | | | | |
|---|---|---|---|---|
| EP | 1519372 A2 * | 3/2005 | ............ | B25J 9/1692 |
| JP | 2018-058142 A | 4/2018 | | |

(Continued)

*Primary Examiner* — Jonathan L Sample
(74) *Attorney, Agent, or Firm* — Faegre Drinker Biddle & Reath LLP

(57)          ABSTRACT

A robot control device comprises: a storage unit a first imaging position for performing stereoscopic measurement on a subject installed in a work space, and a second imaging position for performing stereoscopic measurement on the subject which has a larger parallax than that of the stereoscopic measurement performed at the first imaging position; a first measurement unit that performs the stereoscopic measurement on the subject at the first imaging position and acquires a first deviation amount of the robot with respect to the work space; a correcting unit that corrects the position of the robot during the stereoscope measurement at the second imaging position; a second measurement unit that performs the stereoscopic measurement of the subject at the second imaging position and acquires a second deviation amount of the robot with respect to the work space; and an action control unit that corrects an action of the robot.

11 Claims, 7 Drawing Sheets

(56)                 References Cited

U.S. PATENT DOCUMENTS

| | | | | |
|---|---|---|---|---|
| 11,138,684 B2 * | 10/2021 | Yoshida | ................. | G06T 1/0014 |
| 2008/0004750 A1 * | 1/2008 | Ban | ..................... | G01B 21/042 |
| | | | | 700/245 |
| 2008/0082213 A1 * | 4/2008 | Ban | ........................ | B25J 9/1697 |
| | | | | 901/50 |
| 2010/0234993 A1 * | 9/2010 | Seelinger | .............. | B25J 9/1697 |
| | | | | 700/254 |
| 2013/0010070 A1 * | 1/2013 | Tateno | ................... | B25J 9/1697 |
| | | | | 901/14 |
| 2014/0067317 A1 * | 3/2014 | Kobayashi | .............. | G05D 3/00 |
| | | | | 702/153 |
| 2016/0059419 A1 * | 3/2016 | Suzuki | .................. | B25J 9/1692 |
| | | | | 901/14 |
| 2018/0194007 A1 * | 7/2018 | Namiki | ................... | B25J 19/04 |
| 2018/0194008 A1 * | 7/2018 | Namiki | ..................... | G06T 7/80 |
| 2019/0149802 A1 * | 5/2019 | Tanaka | ................ | G05B 19/402 |
| | | | | 348/43 |
| 2022/0048199 A1 * | 2/2022 | Heidemann | .............. | G06T 7/73 |
| 2023/0071384 A1 * | 3/2023 | Agarwal | ............... | B25J 19/023 |

FOREIGN PATENT DOCUMENTS

| | | | |
|---|---|---|---|
| JP | 2020-163518 A | 10/2020 |
| WO | WO-2022/014312 A1 | 1/2022 |
| WO | WO-2022/075303 A1 | 4/2022 |

* cited by examiner

ROBOT CONTROL DEVICE

FIELD

The present disclosure relates to a robot control device.

BACKGROUND

In recent years, an automated system for automating various types of work by a robot which is carried, for example, on a cart or an automated guided vehicle (AGV) and arranged at a place near a workspace of an industrial machine, such as a machine tool, has been proposed. In such an automated system, when the robot performs various types of work such as loading/unloading of a processed target object into and from the industrial machine, a stopping position of the cart or the AGV on which the robot is mounted changes. Thus, it is necessary to measure a deviation of a stopping position of the cart or the AGV from the industrial machine, and correct a motion of the robot in such a way that work can be correctly performed with respect to the workspace.

PTL1 describes a robot system including: a robot; a robot conveyance device for moving the robot mounted thereon to a predetermined workspace; at least two target marks installed in the workspace; a target mark position acquisition unit that acquires a three-dimensional position by performing stereo measurement of the at least two target marks by a vision sensor provided on the robot; a deviation amount acquisition unit that acquires, from the acquired three-dimensional position, a deviation amount from an expected relative position between the robot and the workspace; and a robot control unit that controls the robot to perform a motion by using a motion amount corrected, by the acquired deviation amount, from a predetermined motion amount (claim 1).

PTL 2 relates to a robot system in which a two-dimensional camera is mounted on a tip of an arm of a robot, and describes as follows: "First, the camera captures a first mark. Next, after the robot moves to an extent that the first mark does not fall outside a visual field of the camera, the camera captures the first mark again. The camera captures the same mark from two different viewpoints. A coordinate value (x, y, z) of a three-dimensional position of the first mark can be acquired by the stereo measurement. Next, similar measurement is performed on a second mark and a third mark. A plane passing through three points can be three-dimensionally calculated by using the three-dimensional positions of the first mark, the second mark, and the third mark. As a result, a three-dimensional positional relationship between the robot and a machine tool can be acquired." (paragraph 0084).

CITATION LIST

Patent Literature

[PTL 1] International Patent Publication No. WO2022/075303 A1
[PTL 2] Japanese Unexamined Patent Publication (Kokai) No. 2018-058142 A

SUMMARY

Technical Problem

In regard to measurement of a position of a robot with respect to a workspace, a technique in which measurement of a positional relationship between the robot and the workspace is performed by attaching a camera on a tip of the robot and performing stereo measurement of a target mark installed in the workspace is widely used. With regard to the stereo measurement, it has been known that the accuracy of the measurement decreases unless parallax in a captured image is set wide. When the target mark is to be captured too close to an edge of an image in order to set parallax long, the target mark falls outside a visual field even by a small position deviation of the robot. A robot control device that can reliably perform the stereo measurement with a high degree of accuracy is desired.

Solution to Problem

An aspect of the present disclosure is a robot controller for controlling a robot, and the robot controller includes: a storage unit configured to store a first capturing position for performing stereo measurement on a target installed in a workspace by a visual sensor mounted on the robot, and a second capturing position for performing stereo measurement on the target by the visual sensor, the second capturing position having increased parallax as compared to stereo measurement in the first capturing position; a first measurement unit configured to perform stereo measurement of the target in the first capturing position, and acquire a first deviation amount of the robot from the workspace; a correction unit configured to correct a position of the robot in stereo measurement in the second capturing position, based on the first deviation amount; a second measurement unit configured to perform stereo measurement of the target in the second capturing position, and acquire a second deviation amount of the robot from the workspace; and a motion control unit that corrects a motion of the robot, based on the second deviation amount.

Another aspect of the present disclosure is a robot controller including: a storage unit configured to store a first capturing position for performing stereo measurement on a target installed in a workspace by a visual sensor mounted on a robot, and a second capturing position for performing stereo measurement on the target by the visual sensor, the second capturing position having increased parallax as compared to stereo measurement in the first capturing position; a measurement unit configured to perform stereo measurement of the target in the first capturing position and stereo measurement of the target in the second capturing position in an order; a coordinate system data output unit configured to output coordinate system data that express a specific coordinate system, based on a first deviation amount between the robot and the workspace being acquired by the stereo measurement in the first capturing position; and a motion control unit configured to correct a motion of the robot, based on a second deviation amount of the robot from the workspace being acquired by stereo measurement in the second capturing position, wherein the second capturing position is expressed by the specific coordinate system. Still another aspect of the present disclosure is a robot controller including: a storage unit configured to store a first capturing position for performing stereo measurement on a target installed in a workspace by a visual sensor mounted on a robot, and a second capturing position for performing stereo measurement on the target by the visual sensor, the second capturing position having increased parallax as compared to stereo measurement in the first capturing position; a measurement unit configured to perform stereo measurement of the target in the first capturing position and stereo measurement of the target in the second capturing position in an order; a coordinate system data output unit configured to output coordinate system data that express a specific coordinate system, based on a detected position of the target being acquired by the stereo measurement in the first capturing position; and a motion control unit configured to correct a motion of the robot, based on a deviation amount of the robot from the workspace being acquired by stereo measurement in the second capturing position, wherein the second capturing position is expressed by the specific coordinate system.

The objects, the features, and the advantages, and other objects, features, and advantages will become more apparent from the detailed description of typical embodiments of the present invention illustrated in accompanying drawings.

DESCRIPTION OF EMBODIMENTS

Figure 1:
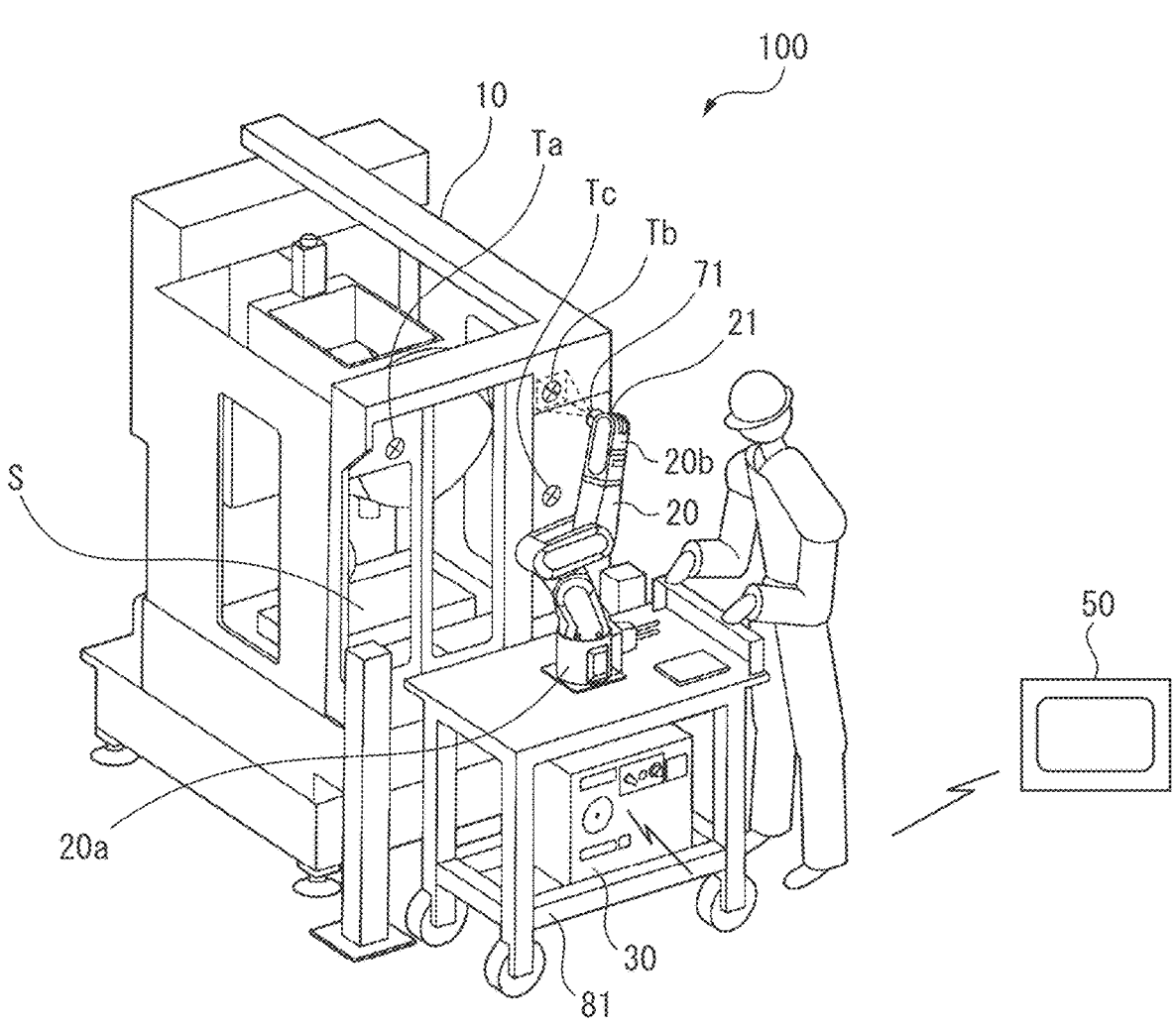
FIG. 1 is a diagram illustrating an apparatus configuration of a robot system including a robot controller according to one embodiment.

Next, embodiments of the present disclosure will be described with reference to drawings. A similar configuration portion or a similar functional portion is denoted by the same reference sign in the referred drawings. A scale is appropriately changed in the drawings in order to facilitate understanding. An aspect illustrated in the drawing is one example for implementing the present invention, and the present invention is not limited to the illustrated aspect.

FIG. 1 is a diagram illustrating an apparatus configuration of robot system 100 including robot controller 30 according to an embodiment. Robot system 100 includes machine tool 10, industrial robot (hereinafter described as a robot) 20, robot controller 30 that controls robot 20, conveyance device 81 for conveying robot 20 and robot controller 30, and teaching device 50. Visual sensor 71 is attached to an arm tip portion (wrist portion) 21 of robot 20. Robot 20 is arranged in a predetermined position in front of machine tool 10 while robot 20 is mounted on conveyance device 81, and performs predetermined work for loading/unloading a work target object (hereinafter described as a workpiece) into and from machine tool 10, and the like. In other words, robot system 100 is formed as an automated system for automating loading/unloading of a workpiece into and from machine tool 10 by robot 20.

In FIG. 1, as an example, robot 20 is assumed to be a vertical articulated robot. A robot of various types such as a parallel link robot and a dual arm robot may be used as robot 20 according to a work target. Robot 20 includes base 20$a$ attached to conveyance device 81, and arm portion 20$b$. Robot 20 can perform desired work by an end effector (tool) (not illustrated) attached to arm tip portion 21. The end effector is an external device which is exchangeable according to use, and is, for example, a hand, a welding gun, a tool, and the like. Conveyance device 81 is, for example, an automatic conveyance device such as a cart or an automated guided vehicle (AGV), or a conveyance rail system.

Robot controller 30 controls a motion of robot 20 according to a motion program or according to a command from teaching device 50. Robot controller 30 may have a configuration as a general computer including a CPU, a ROM, a RAM, a storage device, an operation unit, a display unit, an input/output interface, a network interface, and the like. When conveyance device 81 is the automatic conveyance device, robot controller 30 may be further configured to control a motion of conveyance device 81.

Teaching device 50 is connected to robot controller 30 in a wired or wireless manner, and is used for performing teaching (programming) of robot 20 and various types of setting inputs. Teaching device 50 may be formed of a teach pendant or an information processing device such as a tablet terminal. Teaching device 50 may have a configuration as a general computer including a CPU, a ROM, a RAM, a storage device, an operation unit, a display unit, an input/output interface, a network interface, and the like.

In robot system 100 as in FIG. 1, when conveyance device 81 moves to a position of robot system 100, conveyance device 81 cannot necessarily stop in the same position every time, and thus a position deviation of robot 20 from machine tool 10 may occur. Therefore, robot 20 (robot controller 30) needs to be configured to be able to measure a position deviation of robot 20 from machine tool 10, and correctly perform work with respect to machine tool 10. Thus, visual sensor 71 is mounted on arm tip portion 21 of robot 20, and robot 20 (robot controller 30) is configured to perform work by detecting, with visual sensor 71, a position deviation of robot 20 from workspace S (machine tool 10) and correcting the position deviation.

In the present embodiment, robot 20 (robot controller 30) is configured to measure a position/posture of robot 20 with respect to workspace S by measuring a three-dimensional position of one or a plurality of target marks installed in workspace S. Robot 20 (robot controller 30) uses a stereo method for measuring the three-dimensional position of the target mark. FIG. 1 illustrates an example in which three target marks Ta, Tb, and Tc are installed in workspace S (machine tool 10).

In the present embodiment, visual sensor 71 is assumed to be a two-dimensional camera. Another type of camera that can perform stereo measurement may be used as visual sensor 71. Visual sensor 71 is connected to robot controller 30. In the present embodiment, robot controller 30 is assumed to have a function for controlling visual sensor 71, a function of executing various types of image processing on an image captured by visual sensor 71, and the like. Visual sensor 71 is assumed to be calibrated, and calibration data including data indicating a position of visual sensor 71 with reference to robot 20 are assumed to be stored in advance in storage unit 136 (see FIG. 3) of robot controller 30.

Figure 2:
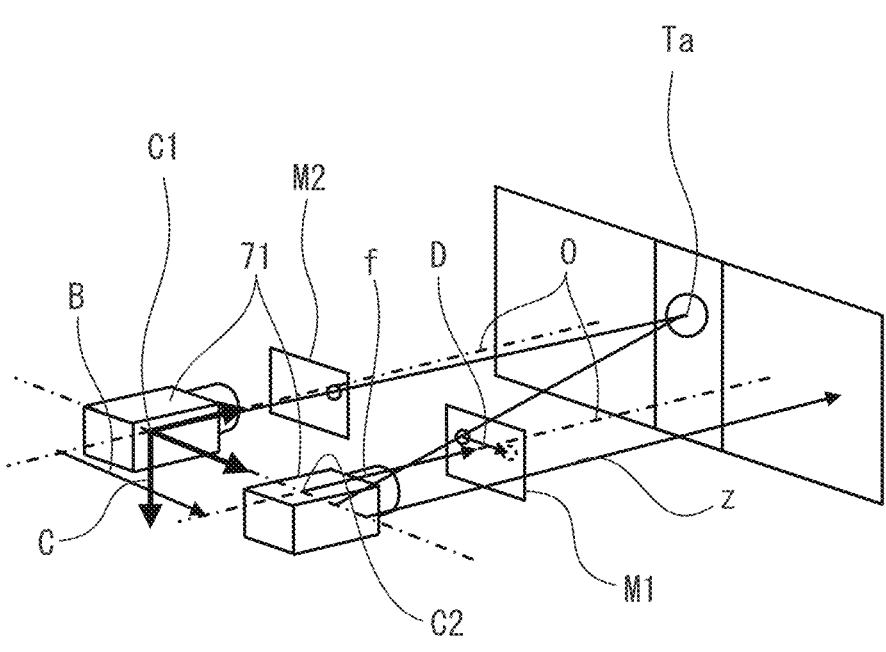
FIG. 2 is a diagram illustrating a detection example of a target mark by a stereo method.

Herein, a detection example of the target mark by the stereo method will be described with reference to FIG. 2. In FIG. 2, two capturing positions/postures of visual sensor 71 when stereo measurement is performed on target mark Ta are set as capturing positions/postures C1 and C2. In order to make description easy, visual sensors 71 are assumed to be equidistantly arranged in parallel in the capturing positions/postures C1 and C2. It should be noted that FIG. 2 illustrates a state where a camera coordinate system C is set in a position of the capturing position/posture C1. In FIG. 2, for the sake of convenience, capturing surfaces M1 and M2 are arranged in front of visual sensor 71. In the capturing positions/postures C1 and C2, it is assumed that visual sensors 71 are arranged away from each other at a baseline length B, optical axes O of visual sensors 71 are arranged in parallel, a capturing surface (image sensor) of visual sensor 71 is arranged in a plane orthogonal to an optical axis O, and an x direction and a y direction of the capturing surfaces of visual sensors 71 are oriented in the same direction.

When the capturing position/posture C1 of the capturing positions/postures C1 and C2 at two places is set as an origin of the camera coordinate system C, a focal distance of visual sensor 71 is set as f, parallax of target mark Ta captured in two captured images is set as D, and a pitch between pixels of visual sensor 71 is set as 1 mm, a distance z (a distance in a depth direction) from the origin of the camera coordinate system C to target mark Ta is acquired from an equation below by the stereo method.

$$z = B \cdot f / D \qquad (1)$$

The baseline length B and a focal distance f are determined by the capturing positions/postures C1 and C2 and specifications of visual sensor 71, and thus robot controller 30 can detect the distance z of target mark Ta when the parallax D of the target mark captured in the two captured images is acquired based on detection processing (including matching processing) of target mark Ta.

In stereo measurement, a target mark is captured from two positions, but it has been known that, at this time, measurement accuracy in a line-of sight direction decreases unless the parallax D in two pieces of capturing is set long. However, when the target mark is captured too close to an edge of an image in order to set the parallax D long, a situation where the target mark falls outside a visual field (captured image) may occur by a small position deviation of conveyance device 81 (i.e., a small position deviation of robot 20 from workspace S). In view of this, robot controller 30 performs stereo measurement by the following procedure.

(Procedure 1) Stereo measurement for the first time is performed in a first capturing position in which a target mark is captured in a portion close to the center of an image, and a position of robot 20 with respect to workspace S (machine tool 10) is roughly corrected based on the measurement result.

(Procedure 2) Next, stereo measurement for the second time is performed in a second capturing position (a capturing position in which the target mark is captured in a position close to an edge of the image) having wider parallax than that in the first capturing position, and the position of robot 20 with respect to workspace S is accurately corrected based on the measurement result.

A worker teaches the first capturing position and the second capturing position in advance to robot 20 arranged at a reference position. It should be noted that each of the first capturing position and the second capturing position for stereo measurement actually includes capturing positions/postures at two places (capturing positions/postures C1 and C2 in the example in FIG. 2), but is described as the first capturing position and the second capturing position for convenience of description.

The second capturing position is a capturing position taught to the robot in such a way as to capture the target mark in the edge of the image, but the position of robot 20 is corrected by the first stereo measurement with a certain degree of accuracy, and thus occurrence of a situation where the target mark falls outside a visual field due to a position deviation of robot 20 and the like can be avoided in capturing in the second capturing position, and accurate stereo measurement can be reliably performed.

Figure 3:
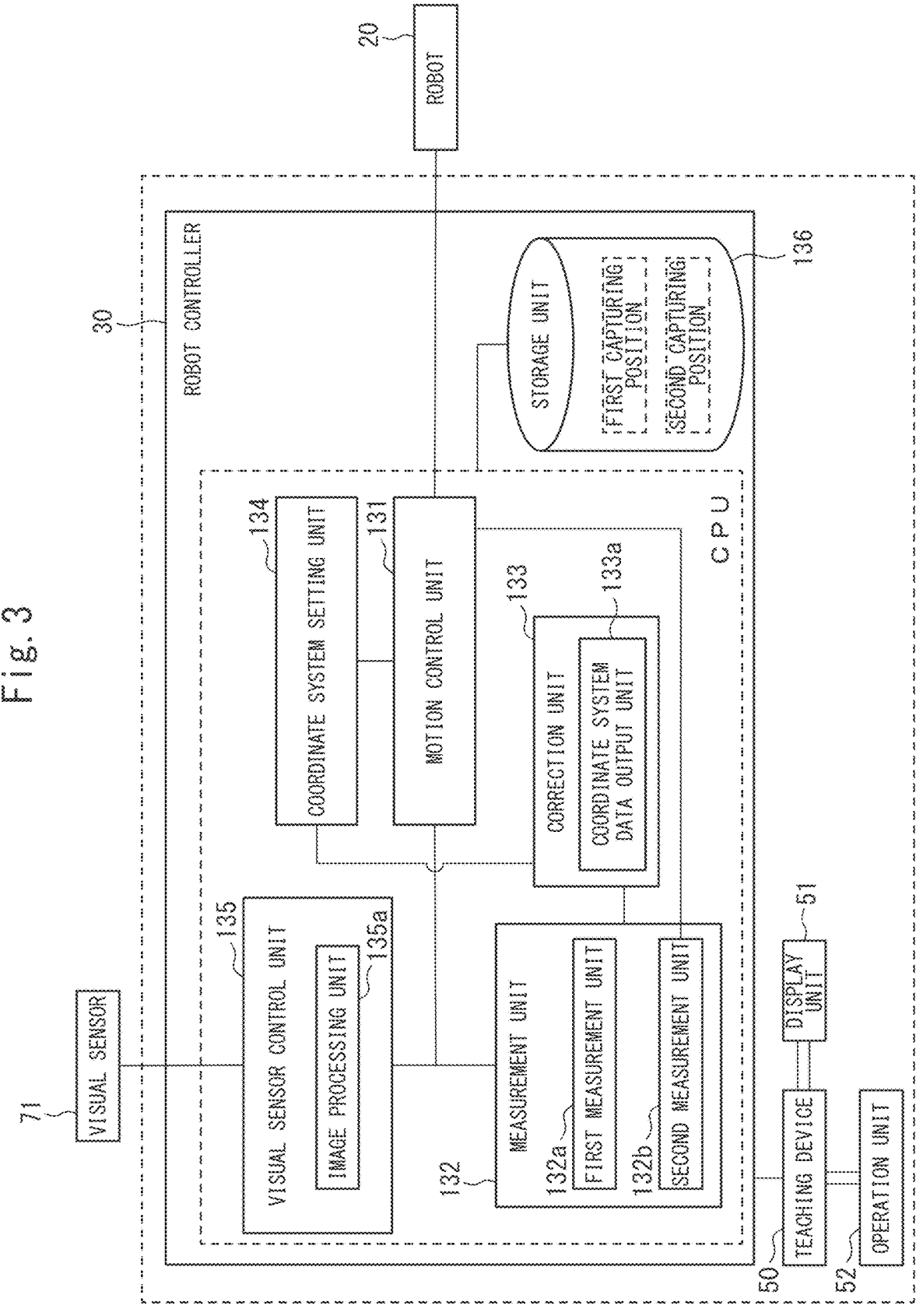
FIG. 3 is a functional block diagram of the robot controller.

FIG. 3 is a functional block diagram of robot controller 30. As illustrated in FIG. 3, robot controller 30 includes motion control unit 131, measurement unit 132, correction unit 133, coordinate system setting unit 134, visual sensor control unit 135, and storage unit 136. Motion control unit 131, measurement unit 132, correction unit 133, coordinate system setting unit 134, and visual sensor control unit 135 among the functional blocks may be functions achieved by a CPU (processor) of robot controller 30 executing software.

Storage unit 136 stores, for example, various types of programs such as a motion program and a measurement program, information (shape data, reference three-dimensional position information, and the like) about the first capturing position, the second capturing position, coordinate system information, calibration data, and a target mark, and other various types of information.

Coordinate system setting unit 134 provides a function for performing setting of a coordinate system. For example, the coordinate system information set via coordinate system setting unit 134 is saved in storage unit 136. A coordinate system that can be set in robot controller 30 (coordinate system setting unit 134) includes a world coordinate system, a robot coordinate system, a flange coordinate system, a tool coordinate system, a camera coordinate system, a user coordinate system, and the like. For example, the robot coordinate system is set in base 20a (see FIG. 1) of robot 20. For example, camera coordinate system C is set in a reference position of visual sensor 71 as described above. The user coordinate system is a coordinate system that can be set by user setting, and may include a workpiece coordinate system set in a workpiece, and the like.

For example, motion control unit 131 controls a motion of robot 20 according to the motion program stored in storage unit 136. Robot controller 30 includes a servo control unit (not illustrated) that performs servo control on a motor of each axis of robot 20, based on a command generated by motion control unit 131.

Measurement unit 132 measures a three-dimensional position of a target by a stereo measurement method. For example, measurement unit 132 performs stereo measurement of a target by using an image processing function (such as matching processing) of visual sensor control unit 135 (image processing unit 135a). Measurement unit 132 includes first measurement unit 132a and second measurement unit 132b.

First measurement unit 132a acquires a three-dimensional position of a target mark, based on the first capturing position stored in storage unit 136, and acquires a deviation amount of a positional relationship between workspace S and robot 20, based on the three-dimensional position of the target mark.

Correction unit 133 corrects a position of robot 20, based on the deviation amount between robot 20 and workspace S being acquired by first measurement unit 132a. Correction unit 133 includes coordinate system data output unit 133a, and provides a function of correcting the position of robot 20 by shifting a specific coordinate system, based on the deviation amount acquired by first measurement unit 132a.

Second measurement unit 132b acquires a three-dimensional position of the target mark, based on the second capturing position stored in storage unit 136, and acquires a deviation amount of the positional relationship between workspace S and robot 20, based on the three-dimensional position of the target mark. Second measurement unit 132*b* provides the calculated deviation amount to motion control unit 131. Motion control unit 131 corrects a motion of the robot, based on the deviation amount.

Visual sensor control unit 135 has a function of controlling visual sensor 71 and a function of executing image processing on an image captured by visual sensor 71. Visual sensor control unit 135 includes image processing unit 135*a* that performs the function of image processing. Visual sensor control unit 135 can execute the detection processing of detecting a target object by matching between an image of the target object in a captured image and a model pattern. Data such as the model pattern of the target object may be saved in storage unit 136. It is assumed that visual sensor 71 has been already calibrated, and calibration data (an external parameter and an internal parameter) are stored in, for example, storage unit 136. Thus, in robot controller 30 (visual sensor control unit 135), a relative positional relationship between robot 20 and visual sensor 71 is already known.

It should be noted that, in the present embodiment, robot controller 30 is assumed to include visual sensor control unit 135, but the function as visual sensor control unit 135 may be provided by a device separately provided from robot controller 30.

Figure 4:
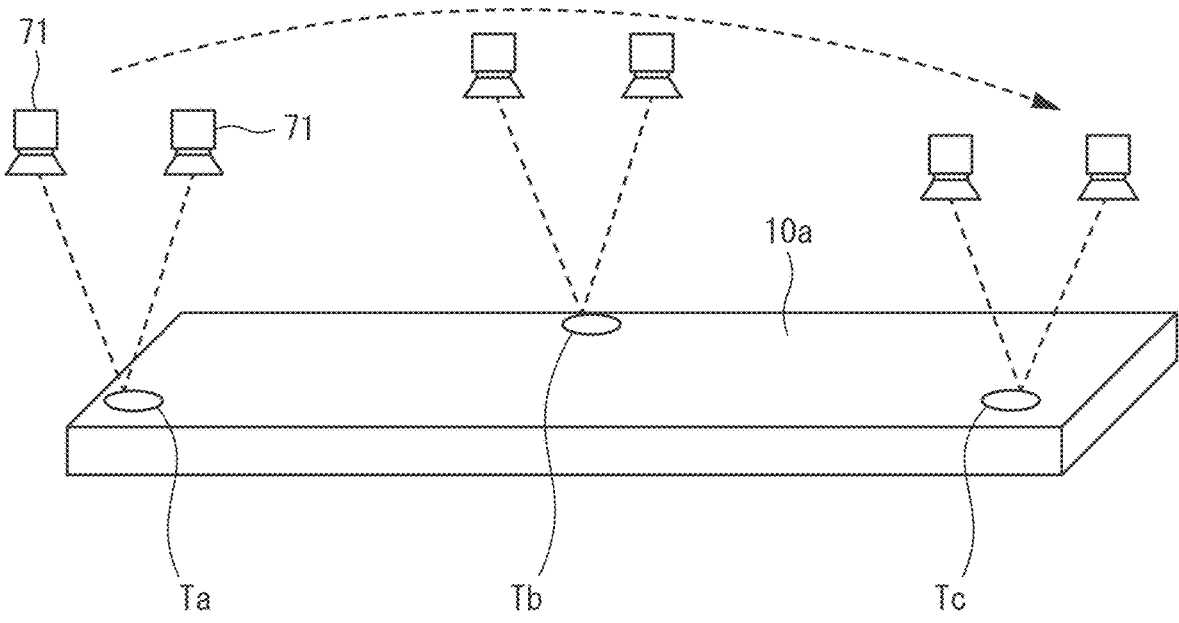
FIG. 4 is a diagram illustrating a calculation example of a deviation amount between a robot and a workspace.

A calculation example of a deviation amount between robot 20 and workspace S (machine tool 10) by measurement unit 132 (first measurement unit 132*a* and second measurement unit 132*b*) will be described below. As illustrated in FIG. 4, in the present example, stereo measurement is performed on each of three target marks Ta, Tb, and Tc installed on surface 10*a* of the machine tool, and a three-dimensional position of each of target marks Ta, Tb, and Tc is measured. FIG. 4 illustrates a situation where visual sensor 71 performs capturing from positions at two places for each of target marks Ta, Tb, and Tc.

Next, measurement unit 132 acquires a three-dimensional position/posture of workspace S (machine tool 10) with respect to robot 20 by combining the acquired three-dimensional positions of three target marks Ta, Tb, and Tc. In other words, a position and a posture of the entire target object are acquired by three-dimensionally measuring three places of one target object and combining the measurement results. Herein, three places on surface 10*a* of machine tool 10 are measured, and a position and a posture of the entire machine tool are calculated.

Measurement unit 132 calculates a three-dimensional position (X, Y, Z, W, P, R) of the entire machine tool 10 from three-dimensional positions (X, Y, Z) of three target marks Ta, Tb, and Tc. At this time, measurement unit 132 calculates the three-dimensional position (X, Y, Z, W, P, R) of the entire machine tool by calculating a coordinate system determined by setting a position of a first target mark as an origin, a position of a second target mark as a point in an X-axis direction, and a position of a third target mark as a point on an XY plane.

Measurement unit 132 acquires a deviation amount between the three-dimensional position (X, Y, Z, W, P, R) of machine tool 10 acquired by the measurement, and a reference three-dimensional position (or a past three-dimensional position) of machine tool 10. In other words, measurement unit 132 performs an operation of translation and rotation in such a way that the coordinate system of machine tool 10 by the current measurement overlaps a coordinate system in the reference position, and sets, as the deviation amount (correction amount), a movement amount of the coordinate system acquired by the operation.

It should be noted that, herein, the example of acquiring the positional relationship between robot 20 and workspace S (machine tool 10) by the three target marks is described, but, in a case of two points, a rotational amount around a line segment connecting the two points as an axis cannot be identified. However, when the rotational amount is less likely to change in terms of a system configuration, sufficiently practical measurement can be performed even in the case of two points.

A case where the positional relationship between robot 20 and workspace S (machine tool 10) is acquired by one target mark can also be achieved by using a specific target mark (a mark in which a position, a shape, a size, and the like are known).

Figure 5:
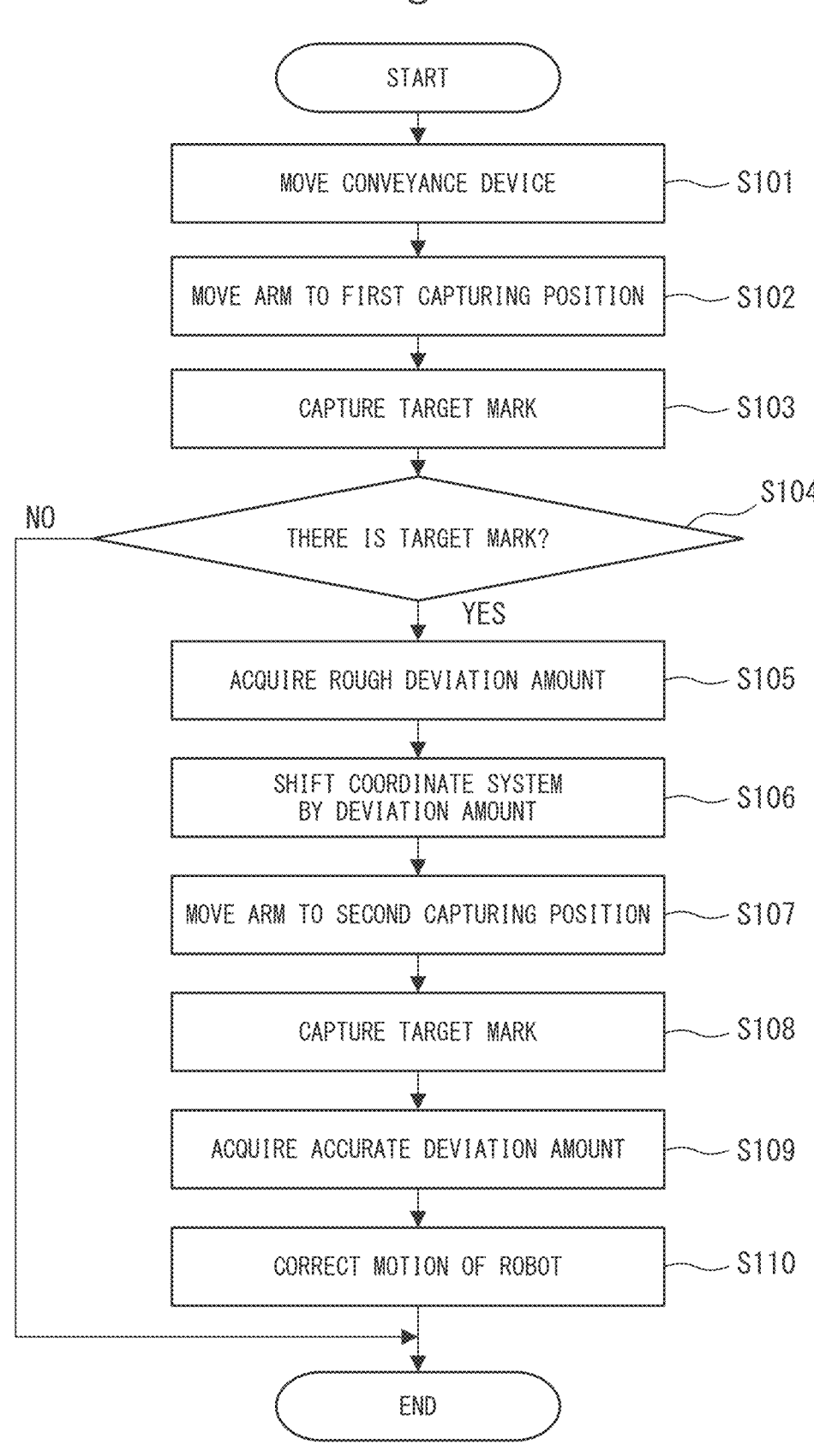
FIG. 5 is a flowchart of stereo measurement processing.

FIG. 5 is a flowchart illustrating a specific motion example of stereo measurement processing by measurement unit 132. The stereo measurement processing is executed under control by the CPU of robot controller 30. A measurement program of the stereo measurement processing may be stored in storage unit 136. In the present motion example, calculation of a deviation amount between robot 20 and workspace S is assumed to be performed by a method for combining measurement positions of three target marks (Ta, Tb, Tc) described above. For each of three target marks (Ta, Tb, Tc), a capturing position (first capturing position) having relatively narrow parallax, and a capturing position (second capturing position) having relatively wide parallax are taught to the robot in advance, and are stored in storage unit 136.

As one example, the first capturing position is assumed to be taught to the robot based on a robot coordinate system (expressed by the robot coordinate system). In teaching of the first capturing position, parallax does not need to be set wide, and thus a worker does not need to teach a position/posture of visual sensor 71 to the robot in such a way that the target mark is located in an edge of a visual field.

The second capturing position is a capturing position determined in such a way that parallax is wider than that in the first capturing position. The worker performs teaching of the second capturing position in such a way that the target mark is located close to the edge of the visual field. As one example, the second capturing position may be taught to the robot based on a user coordinate system set by the worker (may be expressed by the user coordinate system). In this case, the worker can perform the teaching of the second capturing position while controlling robot 20 to perform a motion based on the user coordinate system, and thus the teaching of the second capturing position can be made easier. For example, the user coordinate system in this case may be, in workspace S, (1) a coordinate system set on the target mark or (2) a coordinate system set in a position relatively close to the target mark.

For convenience of description below, the coordinate system used in teaching of the second capturing position is defined as a user coordinate system UF1.

As illustrated in FIG. 5, first, conveyance device 81 is moved by a user operation or automatically to a predetermined position for performing work (step S101). First measurement unit 132*a* and correction unit 133 control processing of steps S102 to S106. First measurement unit 132*a* cooperates with motion control unit 131, and moves robot 20 (arm portion 20*b*) to the first capturing position (step S102).

Next, first measurement unit 132*a* performs, with visual sensor 71, capturing of a target mark in the first capturing position (step S103). Specifically, first measurement unit 132a causes visual sensor 71 to perform capturing of the target mark in the first capturing position via visual sensor control unit 135, and also causes visual sensor control unit 135 (image processing unit 135a) to execute the detection processing of detecting the target mark in a captured image. The detection processing by visual sensor control unit 135 (image processing unit 135a) includes extracting a feature of the target mark from the captured image, and detecting a position of the target mark by matching processing.

Next, first measurement unit 132a checks whether there is the target mark in the captured image (step S104). The first capturing position is set to be a position in which the target is easily captured within a visual field of visual sensor 71, and thus, herein, it is normally determined that there is the target mark (S104: YES). When it is determined that there is no target mark in the captured image (S104: NO), the present processing ends.

The processing in steps S102 to S104 is executed for each of three target marks (Ta, Tb, Tc).

Next, in step S105, first measurement unit 132a acquires a three-dimensional position of target marks (Ta, Tb, Tc) by a stereo measurement method, based on the captured image captured in the first capturing position for each of three target marks (Ta, Tb, Tc). First measurement unit 132a acquires a deviation amount from an expected relative positional relationship between robot 20 and workspace S, based on the measured three-dimensional position. A position of target marks (Ta, Tb, Tc) detected on the captured image may be acquired as position information on the robot coordinate system (or a world coordinate system) by using calibration data. Specifically, the calibration data include information indicating a position (camera coordinate system) of a camera (visual sensor 71) with respect to a coordinate system (mechanical coordinate system) set at a tip of robot 20. On the other hand, robot controller 30 can recognize a position (the mechanical coordinate system) of the tip of the robot in the robot coordinate system. Therefore, a two-dimensional point in a sensor coordinate system and a three-dimensional point in the mechanical coordinate system are associated with each other by using the calibration data, and, furthermore, the mechanical coordinate system is converted into the robot coordinate system, and thus the two-dimensional point on the sensor coordinate system during capturing by the visual sensor and the three-dimensional point in the robot coordinate system can be associated with each other. In this way, a three-dimensional position of the target mark can be acquired. Therefore, the deviation amount of the robot from workspace S is acquired. It should be noted that the position of the target mark can also be calculated as a position on the world coordinate system by using a known relationship between the robot coordinate system and the world coordinate system (a coordinate system set in workspace S).

Next, coordinate system data output unit 133a shifts the coordinate system (user coordinate system UF1) used in teaching of the second capturing position, based on the deviation amount (step S106). In this way, the user coordinate system UF1 is updated to a state where the deviation amount is corrected, and thus the robot can be correctly moved to a teaching point having been taught before in the user coordinate system UF1. In other words, a position and a posture of the tip of robot 20 (a position and a posture of visual sensor 71) are corrected by the stereo measurement by first measurement unit 132a.

It should be noted that although the correction of the position of robot 20 herein is not highly accurate due to the fact that the stereo measurement is based on the captured image in which the target mark is captured in a position relatively close to the center of the captured image, the quality of the measurement is sufficiently proper for the purpose of preventing the target mark from falling outside the captured image in capturing in the next second capturing position.

The deviation amount acquired by first measurement unit 132a is set as O1. Deviation amount O1 is calculated as, for example, the deviation amount in the robot coordinate system. Coordinate system data output unit 133a calculates a coordinate system UF1' acquired by shifting the user coordinate system UF1 by the following calculation equation (2).

$$UF1' = UF1 \cdot O1 \qquad (2)$$

Herein, UF1 represents an origin position of the user coordinate system UF1 when viewed from the robot coordinate system, and is represented in a homogeneous transformation matrix.

Coordinate system data output unit 133a outputs a value of calculation result UF1' as coordinate system data of the user coordinate system UF1. Coordinate system data output unit 133a can operate in such a way as to update the user coordinate system UF1 by sending the calculation result to coordinate system setting unit 134. In this way, the user coordinate system UF1 is a coordinate system acquired by shifting the original user coordinate system UF1 according to the deviation amount.

Figure 6:
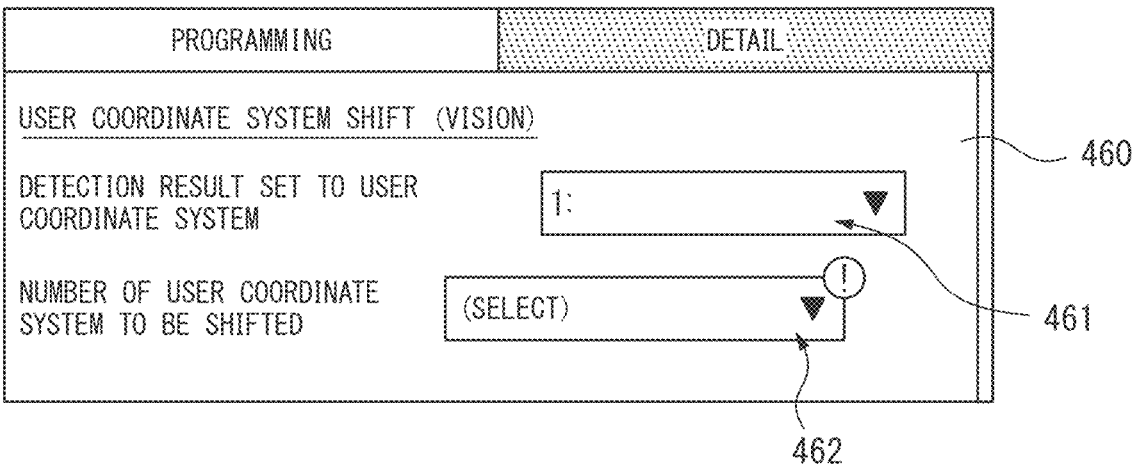
FIG. 6 is a diagram illustrating an example of a user interface screen for specifying a coordinate system of a target to be shifted based on a measured deviation amount.

Coordinate system data output unit 133a may be configured to be able to display a user interface (UI) for specifying a source from which a detection result (deviation amount) for shifting the coordinate system is extracted, and specifying the coordinate system being a target to be shifted. FIG. 6 is a diagram illustrating an example of setting screen 460 for performing such a setting. Setting screen 460 may be displayed on a display screen of display unit 51 of teaching device 50 and may be configured to allow a user to perform setting via operation unit 52.

As illustrated in FIG. 6, setting screen 460 includes selection column 461 for selecting a source from which the detection result (i.e., a deviation amount calculated by first measurement unit 132a) to be set to a user coordinate system is extracted. The deviation amount as the measurement result by first measurement unit 132a is output to a specific output destination (such as a specific register). In this case, for example, a register number from which the deviation amount calculated by first measurement unit 132a is extracted is specified in selection column 461.

Setting screen 460 further includes specification column 462 for specifying the number of user coordinate system to be shifted. A user coordinate system to be shifted by using the detection result selected in selection column 461 is specified in specification column 462. In the example of equation (2) described above, user coordinate system UF1 is specified in specification column 462. Setting screen 460 may be configured such that the selection by selection column 461 and the specification by specification column 462 can be performed via a pop-up menu. Setting screen 460 may be activated as a setting screen for performing detailed setting of a command sentence (or a command in an icon form) representing a function of shifting a coordinate system.

Second measurement unit 132b controls processing of subsequent steps S107 to S110. Second measurement unit 132b moves robot 20 (arm portion 20b) to the second capturing position (step S107). As described above, the second capturing position is taught to the robot in the user coordinate system UF1, and, herein, robot 20 moves based on the user coordinate system UF1 updated (corrected) as described above. Next, second measurement unit 132b performs, with visual sensor 71, capturing in the second capturing position (step S108). It should be noted that in the above explanation, the expression of moving to the second capturing position and performing capturing is used for the sake of simplicity, but, in fact, the second capturing position includes capturing positions at two places, and visual sensor 71 captures the target mark at the two places. The processing in steps S107 and S108 is executed for each of three target marks (Ta, Tb, Tc).

Second measurement unit 132b causes visual sensor control unit 135 to execute the detection processing of the target mark, based on the captured image. Second measurement unit 132b acquires a three-dimensional position of the target mark by calculation by the stereo measurement method, based on a position of the target mark acquired by the detection processing. The stereo measurement herein is performed by an image in which the target mark is captured in a position close to an edge of the image (by performing capturing in such a way that parallax is wide), and thus an accurate measurement result is acquired. Therefore, second measurement unit 132b can acquire an accurate deviation amount related to a relative positional relationship between robot 20 and workspace S (step S109).

Second measurement unit 132b provides the acquired accurate deviation amount to, for example, motion control unit 131, and motion control unit 131 corrects a motion of robot 20, based on the acquired deviation amount (step S110). In this way, the motion of the robot is corrected based on the deviation amount of the positional relationship between robot 20 and workspace S being acquired by second measurement unit 132b. The deviation amount measured by second measurement unit 132b is accurate, and thus the motion of robot 20 is accurately corrected.

Figure 7:
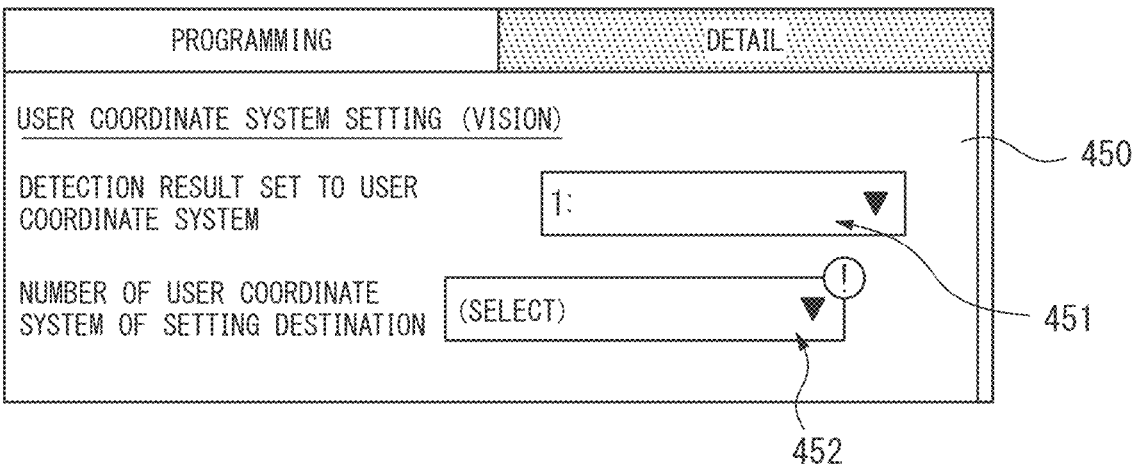
FIG. 7 is a diagram illustrating an example of a user interface screen related to user coordinate system setting.

In the embodiment described above in relation to the stereo measurement processing in FIG. 5, the motion when a position of robot 20 is corrected by coordinate system output unit 133a shifting a preset coordinate system (user coordinate system) is described. On the other hand, coordinate system data output unit 133a can also operate in such a way as to set the user coordinate system. In this case, the operation is performed by the following procedure.
(Procedure A1) Conveyance device 81 is positioned in a reference position, and "user coordinate system setting" is performed. Herein, the "user coordinate system setting" means that, via UI screen 450 as illustrated in FIG. 7, (b1) selection of a storage destination of a detection result to be set to the user coordinate system and (b2) specification of the user coordinate system in which the selected detection result is to be reflected are performed. In the present operation example, coordinate system data output unit 133a provides such setting screen 450. Setting screen 450 may be displayed on the display screen of display unit 51 of teaching device 50 and may be configured to allow a user to perform setting via operation unit 52. Setting screen 450 includes (b1) selection column 451 for selecting a storage destination of a detection result to be set to the user coordinate system, and (b2) specification column 452 for specifying the user coordinate system in which the selected detection result is to be reflected. In (b1) the selection of the storage destination of the detection result, a storage destination of a measurement result in the first capturing position is selected in advance. In (b2) the specification of the user coordinate system, a user can specify the number of any user coordinate system. Then, coordinate system data output unit 133a performs measurement in the first capturing position, and generates and sets coordinate system data based on a detection result as coordinate system data of the coordinate system of which the number is specified by the user in (b2).

Specifically, coordinate system data output unit 133a operates as follows.
(Procedure A1-1) A detected position P1 is acquired from the storage destination specified in (b1) described above. It is assumed that the detected position P1 is a position of a target mark on a coordinate system UFk used in teaching of the first capturing position.
(Procedure A1-2) The coordinate system data output unit 133a converts the detected position P1 into a position P1' in a robot coordinate system (or a world coordinate system) by the following equation (3).

$$P1' = UFk \cdot P1 \qquad (3)$$

Herein, UFk represents an origin position of UFk when viewed from the robot coordinate system (or the world coordinate system), and is represented in a homogeneous transformation matrix. (Procedure A1-3) Coordinate system data output unit 133a enters a content of P1', as the coordinate system data, into the user coordinate system specified in (b2) described above. In this way, the user coordinate system specified in (b2) described above is a coordinate system in which P1' when viewed from the robot coordinate system (or the world coordinate system) is set to be an origin.

(Procedure A2) Next, the second capturing position is taught to the robot based on the user coordinate system set in procedure A1-3 in a state where the positional relationship between robot 20 and workspace S set in procedure A1 is maintained.

(Procedure A3) Furthermore, in a state where the positional relationship between robot 20 and workspace S is set to remain as it is, and a correction motion is taught to robot 20, based on a deviation amount acquired in procedure A2. Also in this case, correction can be performed on a motion of robot 20, based on an accurate deviation amount acquired by measurement of the target mark in the second capturing position.

The stereo measurement processing according to the present embodiment described above can reliably perform stereo measurement in a capturing position having increased parallax (capturing in which a target is captured in an edge of an image), and can thus reliably perform the stereo measurement with a high degree of accuracy.

Further, according to the present embodiment, a permissible degree with respect to a position deviation of a cart or an AGV on which a robot is mounted can be improved, and flexibility as an actual production system can be improved.

As described above, according to the present embodiment, stereo measurement with a high degree of accuracy can be reliably performed.

Although the present disclosure has been described above in detail, the present disclosure is not limited to the individual embodiments described above. Various types of addition, replacement, modification, partial deletion, and the like may be made to the embodiments without departing from the purpose of the present disclosure or without departing from the scope of the present disclosure derived from the contents described in the claims and equivalents thereof. Further, the embodiments can be performed in combination. For example, in the embodiments described above, an order of motions and an order of pieces of processing are indicated as one example, which is not limited thereto. Further, the same also applies to a case where a numerical value or an equation is used in the description of the embodiments described above.

An arrangement of the functional blocks in the functional block diagram illustrated in FIG. 3 is an example, and various modification examples can be configured. For example, a configuration example in which at least a part of the functional blocks arranged in robot controller 30 in FIG. 3 is arranged in teaching device 50 is also possible. It should be noted that, in this case, the entire function by robot controller 30 and teaching device 50 can also be defined as a robot controller.

The functional block of the robot controller illustrated in FIG. 3 may be achieved by executing various types of software stored in a storage device by the CPU of the robot controller, or may be achieved by a configuration in which hardware such as an application specific integrated circuit (ASIC) is a main body.

The program for executing various types of processing such as the stereo measurement processing (FIG. 5) in the embodiments described above can be recorded in various types of computer-readable recording media (for example, a semiconductor memory such as a ROM, an EEPROM, and a flash memory, a magnetic recording medium, and an optical disk such as a CD-ROM and a DVD-ROM).

REFERENCE SIGNS LIST

10 Machine tool
20 Robot
20*a* Base
20*b* Arm portion
21 Arm tip portion
30 Robot controller
71 Visual sensor
50 Teaching device
51 Display unit
52 Operation unit
81 Conveyance device
100 Robot system
131 Motion control unit
132 Measurement unit
132*a* First measurement unit
132*b* Second measurement unit
133 Correction unit
133*a* Coordinate system data output unit
134 Coordinate system setting unit
135 Visual sensor control unit
135*a* Image processing unit
136 Storage unit

The invention claimed is:

1. A robot controller for controlling a robot, the robot controller comprising:
a storage unit configured to store a first capturing position for performing stereo measurement on a target installed in a workspace by a visual sensor mounted on the robot, and a second capturing position for performing stereo measurement on the target by the visual sensor, the second capturing position having increased parallax as compared to stereo measurement in the first capturing position;
a first measurement unit configured to perform stereo measurement of the target in the first capturing position, and acquire a first deviation amount of the robot from the workspace;
a correction unit configured to correct a position of the robot in stereo measurement in the second capturing position, based on the first deviation amount;
a second measurement unit configured to perform stereo measurement of the target in the second capturing position, and acquire a second deviation amount of the robot from the workspace; and
a motion control unit configured to correct a motion of the robot, based on the second deviation amount.

2. The robot controller according to claim 1, further comprising
a correction unit configured to correct a position of the robot by shifting a specific coordinate system that expresses the second capturing position, based on the first deviation amount.

3. The robot controller according to claim 1, wherein
the first capturing position is a teaching position expressed by a first coordinate system, and the robot performs a motion based on the first coordinate system in stereo measurement by the first measurement unit,
the second capturing position is a teaching position expressed by a second coordinate system different from the first coordinate system, and the robot performs a motion based on the second coordinate system in stereo measurement by the second measurement unit, and
the robot controller further comprises a correction unit configured to correct a position of the robot by shifting the second coordinate system, based on the first deviation amount.

4. The robot controller according to claim 3, wherein
the second coordinate system is a user coordinate system set based on user setting.

5. The robot controller according to claim 3, wherein
the correction unit provides a user interface for specifying the second coordinate system being a target to be shifted based on the first deviation amount.

6. The robot controller according to claim 1, wherein
the correction unit includes a coordinate system data output unit that generates and sets coordinate system data that express a specific coordinate system, based on a detected position of the target by the first measurement unit, and
the second capturing position is expressed by the specific coordinate system.

7. A robot controller comprising:
a storage unit that configured to store a first capturing position for performing stereo measurement on a target installed in a workspace by a visual sensor mounted on a robot, and a second capturing position for performing stereo measurement on the target by the visual sensor, the second capturing position having increased parallax as compared to stereo measurement in the first capturing position;
a measurement unit configured to perform stereo measurement of the target in the first capturing position and stereo measurement of the target in the second capturing position in an order;
a coordinate system data output unit configured to output coordinate system data that express a specific coordinate system, based on a first deviation amount between the robot and the workspace being acquired by the stereo measurement in the first capturing position; and a motion control unit configured to correct a motion of the robot, based on a second deviation amount of the robot from the workspace being acquired by stereo measurement in the second capturing position, wherein the second capturing position is expressed by the specific coordinate system.

8. The robot controller according to claim 7, wherein the coordinate system data output unit provides a user interface for accepting specification of a coordinate system of an output destination to which the coordinate system data are output.

9. The robot controller according to claim 7, wherein the specific coordinate system is a user coordinate system set based on user setting.

10. A robot controller comprising:

a storage unit configured to store a first capturing position for performing stereo measurement on a target installed in a workspace by a visual sensor mounted on a robot, and a second capturing position for performing stereo measurement on the target by the visual sensor, the second capturing position having increased parallax as compared to stereo measurement in the first capturing position;

a measurement unit configured to perform stereo measurement of the target in the first capturing position and stereo measurement of the target in the second capturing position in an order;

a coordinate system data output unit configured to output coordinate system data that express a specific coordinate system, based on a detected position of the target being acquired by the stereo measurement in the first capturing position; and a motion control unit configured to correct a motion of the robot, based on a deviation amount of the robot from the workspace being acquired by stereo measurement in the second capturing position, wherein the second capturing position is expressed by the specific coordinate system.

11. The robot controller according to claim 10, wherein the coordinate system data output unit provides a user interface for accepting specification of a coordinate system of an output destination to which the coordinate system data are output.

\*   \*   \*   \*   \*